(12) United States Patent
Tilei et al.

(10) Patent No.: US 7,831,549 B2
(45) Date of Patent: Nov. 9, 2010

(54) OPTIMIZATION OF TEXT-BASED TRAINING SET SELECTION FOR LANGUAGE PROCESSING MODULES

(75) Inventors: Jian Tilei, Tampere (FI); Jani K. Nurminen, Tampere (FI)

(73) Assignee: Nokia Corporation, Espoo (FI)

( * ) Notice: Subject to any disclaimer, the term of this patent is extended or adjusted under 35 U.S.C. 154(b) by 909 days.

(21) Appl. No.: 10/944,517

(22) Filed: Sep. 17, 2004

(65) Prior Publication Data
US 2006/0074924 A1 Apr. 6, 2006

(51) Int. Cl.
G07F 7/00 (2006.01)
(52) U.S. Cl. ............ 707/609; 707/802; 704/231; 704/243; 704/260
(58) Field of Classification Search ............ None
See application file for complete search history.

(56) References Cited

U.S. PATENT DOCUMENTS

| | | | | |
|---|---|---|---|---|
| 5,329,608 | A | * | 7/1994 | Bocchieri et al. ......... 704/243 |
| 5,692,097 | A | * | 11/1997 | Yamada et al. .......... 704/231 |
| 5,737,723 | A | | 4/1998 | Riley et al. |
| 5,754,977 | A | | 5/1998 | Gardner et al. |
| 6,044,343 | A | * | 3/2000 | Cong et al. ............. 704/236 |
| 6,073,099 | A | | 6/2000 | Sabourin et al. |
| 6,810,379 | B1 | * | 10/2004 | Vermeulen et al. ........ 704/260 |
| 2002/0069053 | A1 | * | 6/2002 | Dobler et al. ........... 704/231 |
| 2005/0267755 | A1 | | 12/2005 | Suontausta |

OTHER PUBLICATIONS

Hermann Ney, "The Use of the One-Stage Dynamic Programming Algorithm for Connected Word Recognition", IEEE Transaction Acoustics, Speech and Signal Processing, vol. ASSP-32, No. 2, pp. 263 to 271, 1984.*
Data-Driven Approaches for Automatic Detection of Syllable Boundaries, Tian, Audio-Visual Systems Laboratory, Finland, 4 pgs.
Optimal Subset Selection from Text Databases, Tian et al., ICASSP 2005, Finland, pp. I-305-308.
N-Gram and Decision Tree Based Language Identification for Written Words, Häkkinen et al., 2002 IEEE, pp. 335-338.
A Learning Model for Multiple-Prototype Classification of Strings, Cárdenas, Proceedings of the 17th International Conference on Pattern Recognition (ICPR'04), Spain, 4 pgs.
Speaker- and Language-Independent Speech Recognition in Mobile Communication Systems, Viikki et al., 2001IEEE, pp. 5-8.
Rose and Paul, A Hidden Markov model based keyword recognition system. IEEE, ICASSP Apr. 3, 1990, p. 129-132.

* cited by examiner

*Primary Examiner*—Debbie Le
*Assistant Examiner*—Hasanul Mobin
(74) *Attorney, Agent, or Firm*—AlbertDhand LLP

(57) ABSTRACT

A device and a method provide for selection of a database from a corpus using an, optimization function. The method includes defining a size of a database, calculating a distance using a distance function for each pair in a set of pairs, and executing an optimization function using the distance to select each entry saved in the database until the number of saved entries equals the size of the database. Each pair in the set of pairs includes either two entries selected from a corpus or one entry selected from a set of previously selected entries and another entry selected from a set of a remaining portion of the corpus. The distance function may be a Levenshtein distance function or a generalized Levenshtein distance function.

24 Claims, 3 Drawing Sheets

OPTIMIZATION OF TEXT-BASED TRAINING SET SELECTION FOR LANGUAGE PROCESSING MODULES

FIELD OF THE INVENTION

The present invention is related to Automatic Speech Recognition (ASR) and Text-to-Speech (TTS) synthesis technology. More specifically, the present invention relates to the optimization of text-based training set selection for the training of language processing modules used in ASR or TTS systems, or in vector quantization of text data, etc.

BACKGROUND OF THE INVENTION

ASR technologies allow computers equipped with microphones to interpret human speech for transcription of the speech or for use in controlling a device. For example, a speaker-independent name dialer for mobile phones is one of the most widely distributed ASR applications in the world. As another example, speech controlled vehicular navigation systems could be mentioned. A TTS synthesizer is a computer-based system that is designed to read text aloud by automatically creating sentences through a Grapheme-to-Phoneme (GTP) transcription of the sentences. The process of assigning phonetic transcriptions to words is called Text-to-Phoneme (TTP) or GTP conversion. Language processing modules, such as ASR modules, TTS synthesis modules, language understanding and translation modules, etc. generally utilize models that are trained using text data of some type.

In typical ASR or TTS systems, there are several data-driven language processing modules that have to be trained using text-based training data. For example, in the data-driven syllable detection, the model may be trained using a manually annotated database. Data-driven approaches (i.e., neural networks, decision trees, n-gram models) are also commonly used for modeling the language-dependent pronunciations in many ASR and TTS systems. The model is typically trained using a database that is a subset of a pronunciation dictionary containing GTP or TTP entries. One of the reasons for using just a subset is that it is impossible to create a dictionary containing the complete vocabulary for the most of the languages. Yet another example of a trainable module is the text-based language identification task, in which the model is usually trained using a database that is a subset of a multilingual text corpus that consists of text entries among the target languages.

Additionally, the digital signal processing technique of vector quantization that may be applicable to any number of applications, for instance ASR and TTS systems, utilizes a database. The database contains a representative set of actual data that is used to compute a codebook, which can define the centroids or meaningful clustering in the vector space. Using vector quantization, an infinite variety of possible data vectors may be represented using the relatively small set of vectors contained in the codebook. The traditional vector quantization or clustering techniques designed for numerical data cannot be directly applied in cases where the data consists of text strings. The method described in this document provides an easy approach for clustering text data. Thus, it can be considered as a technique for enabling text string vector quantization.

The performance of the models mentioned above depends on the quality of the text data used in the training process. As a result, the selection of the database from the text corpus plays an important role in the development of these language processing modules. In practice, the database contains a subset of the entire corpus and should be as small as possible for several reasons. First, the larger the size of the database, the greater the amount of time required to develop the database and the greater the potential for errors or inconsistencies in creating the database. Second, for decision tree modeling, the model size depends on the database size, and thus, impacts the complexity of the system. Third, the database size may require balancing among other resources. For example, in the training of a neural network the number of entries for each language should be balanced to avoid a bias toward a certain language. Fourth, a smaller database size requires less memory, and enables faster processing and training.

The database selection from a corpus currently is performed arbitrarily or using decimation on a sorted data corpus. One other option is to do the selection manually. However, this requires a skilled professional is very time consuming and the result could not be considered an optimal one. As a result, the information provided by the database is not optimized. The arbitrary selection method depends on random selections from the entire corpus without consideration for any underlying characteristics of the text data. The decimation selection method uses only the first characters of the strings, and thus, does not guarantee good performance. Thus, what is needed is a method and a system for optimally selecting entries for a database from a corpus in such a manner that the context coverage of the entire corpus is maximized while minimizing the size of the database.

SUMMARY OF THE INVENTION

An exemplary embodiment of the invention relates to a method of selecting a database from a corpus using an optimization function. The method includes, but is not limited to, defining a size of a database, calculating a coefficient using a distance function for each pair in a set of pairs, and executing an optimization function using the distance to select each entry saved in the database until the number of entries of the database equals the size of the database. In the beginning, each pair in the set of pairs includes a first entry selected from a corpus and a second entry selected from the corpus. After the first iteration, the second entry can be selected from the set of previously selected entries (i.e. the database) and the first entry can be selected from the rest of the corpus. The set of pairs includes each combination of the first entry and the second entry.

Executing the optimization function may include, but is not limited to, (a) selecting an initial pair of entries from the set of pairs, wherein the distance of the initial pair is greater than or equal to the distance calculated for each pair in the set of pairs;

(b) moving the initial pair into the database;

(c) identifying a new entry from the corpus, for which the average distance to the entries in the database is greater than or equal to the similar average distances calculated for all the other entries in the corpus (d) moving the chosen entry from the corpus into the database; and (e) if a number of entries of the database is less than the size of the database, repeating (c) and (d).

Another preferred embodiment of the invention relates to a computer program product for training a language processing module using a database selected from a corpus using an optimization function. The computer program product includes, but is not limited to, computer code configured to calculate a coefficient using a distance function for each pair in a set of pairs, to execute an optimization function using the distance to select each entry saved in a database until a number of entries of the database equals a size defined for the database, and to train a language processing module using the database. The coefficient may comprise, but is not limited to, distance. Each pair in the set of pairs includes either two entries selected from a corpus or one entry selected from the set of previously selected entries (i.e. the database) and another entry selected from the rest of the corpus.

The computer code configured to execute the optimization function may include, but is not limited to, computer code configured to:
  (a) select an initial pair of entries from the set of pairs, wherein the distance of the initial pair is greater than or equal to the distance calculated for each pair in the set of pairs;
  (b) moving the initial pair into the database;
  (c) identifying a new entry from the corpus, for which the average distance to the entries in the database is greater than or equal to the similar average distances calculated for all the other, entries in the corpus
  (d) moving the chosen entry from the corpus into the database; and
  (e) if a number of entries of the database is less than the size of the database, repeating (c) and (d).

Still another preferred embodiment of the invention relates to a device for selecting a database from a corpus using an optimization function. The device includes, but is not limited to, a database selector, a memory, and a processor. The database selector includes, but is not limited to, computer code configured to calculate a coefficient using a distance function for each pair in a set of pairs and to execute an optimization function using the distance to select each entry saved in a database until a number of entries of the database equals a size defined for the database. The coefficient may comprise, but is not limited to, distance. Each pair in the set of pairs includes either two entries selected from a corpus or one entry selected from the set of previously selected entries (i.e. the database) and another entry selected from the rest of the corpus. The memory stores the training database selector. The processor couples to the memory and is configured to execute the database selector.

The device configured to execute the optimization function may include, but is not limited to, device configured to:
  (a) select an initial pair of entries from the set of pairs, wherein the distance of the initial pair is greater than or equal to the distance calculated for each pair in the set of pairs;
  (b) moving the initial pair into the database;
  (c) identifying a new entry from the corpus, for which the average distance to the entries in the database is greater than or equal to the similar average distances calculated for all the other entries in the corpus
  (d) moving the chosen entry from the corpus into the database; and
  (e) if a number of entries of the database is less than the size of the database, repeating (c) and (d).

Still another preferred embodiment of the invention relates to a system for processing language inputs to determine an output. The system includes, but is not limited to, a database selector, a language processing module, one or more memory, and one or more processor. The database selector includes, but is not limited to, computer code configured to calculate a distance using a distance function for each pair in a set of pairs and to execute an optimization function using the distance to select each entry saved in a database until a number of entries of the database equals a size defined for the database. The coefficient may comprise, but is not limited to, distance. Each pair in the set of pairs includes either two entries selected from a corpus or one entry selected from the set of previously selected entries (i.e. the training set) and another entry selected from the rest of the corpus.

The language processing module is trained using the database and includes, but is not limited to, computer code configured to accept an input and to associate the input with an output. The one or more memory stores the database selector and the language processing module. The one or more processor couples to the one or more memory and is configured to execute the database selector and the language processing module.

The computer code configured to execute the optimization function may include, but is not limited to, computer code configured to:
  (a) select an initial pair of entries from the set of pairs, wherein the distance of the initial pair is greater than or equal to the distance calculated for each pair in the set of pairs;
  (b) moving the initial pair into the database;
  (c) identifying a new entry from the corpus, for which the average distance to the entries in the database is greater than or equal to the similar average distances calculated for all the other entries in the corpus
  (d) moving the chosen entry from the corpus into the database; and
  (e) if a number of entries of the database is less than the size of the database, repeating (c) and (d).

A further embodiment of the invention relates to a module configured for selecting a database from a corpus, the module configured to:
  (a) define a size of a database;
  (b) calculate a coefficient for at least one pair in a set of pairs; and
  (c) execute a function to select each entry to be saved in the database until a number of entries of the database equals the size of the database.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

DETAILED DESCRIPTION OF THE PREFERRED EMBODIMENTS

The term "text" as used in this disclosure refers to any string of characters including any graphic symbol such as an alphabet, a grapheme, a phoneme, an onset-nucleus-coda (ONC) syllable representation, a word, a syllable, etc. A string of characters may be a single character. The text may include a number or several numbers.

Figure 1:
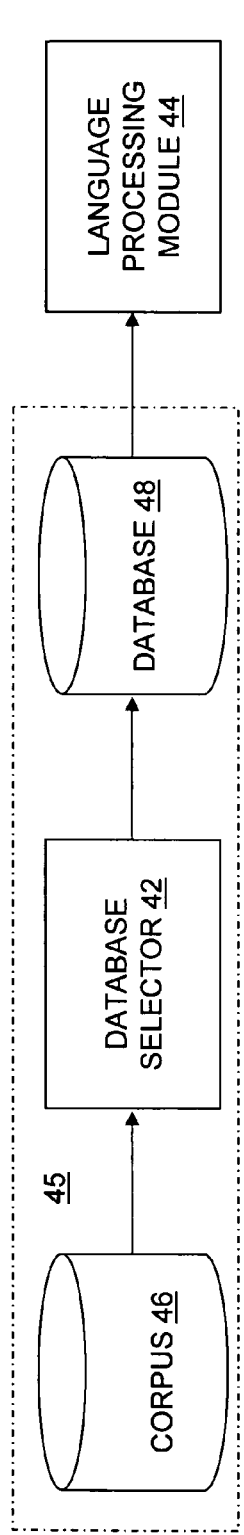
FIG. 1 is a block diagram of a language processing module training sequence in accordance with an exemplary embodiment.

With reference to FIG. 1, a database selection process 45 for training a language processing module 44 is shown. The language processing module 44 may include, but is not limited to, an ASR module, a TTS synthesis module, and a text clustering module. The database selection process 45 includes, but is not limited to, a corpus 46, a database selector 42, and a database 48. The corpus 46 may include any number of text entries. The database selector 42 selects text from the corpus 46 to create the database 48. The database selector 42 may be used to extract text data from the corpus 46 to define the database 48, and/or to cluster text data from the corpus 46 as in the selection of the database 48 to form a vector codebook, In addition, an overall distance measure for the corpus 46 can be determined. The database 48 may be used for training language processing modules 44 for subsequent speech to text or text to speech transformation or may define a vector codebook for vector quantization of the corpus 46.

The database selector 42 may include an optimization function to optimize the database 48 selection. To optimize the selection of entries into the database 48, a distance may be defined among text entries in the corpus 46. For example, an edit distance is a widely used metric for determining the dissimilarity between two strings of characters. The edit operations most frequently considered are the deletion, insertion, and substitution of individual symbols in the strings of characters to transform one string into the other. The Levenshtein distance between two text entries is defined as the minimum number of edit operations required to transform one string of characters into another. In the Generalized Levenshtein Distance (GLD), the edit operations may be weighted using a cost function for each basic transformation and generalized using edit distances that are symbol dependent.

The Levenshtein distance is characterized by the cost functions: $w(a, \epsilon)=1$; $w(\epsilon, b)=1$; and $w(a, b)=0$ if a is equal to b, and $w(a, b)=1$ otherwise; where $w(a, \epsilon)$ is the cost of deleting a, $w(\epsilon, b)$ is the cost of inserting b, and $w(a, b)$ is the cost of substituting symbol a with symbol b. Using the GLD, different costs may be associated with transformations that involve different symbols. For example, the cost $w(x, y)$ to substitute x with y may be different than the cost $w(x, z)$ to substitute x with z. If an alphabet has s symbols, a cost table of size $(s+1)$ by $(s+1)$ may store all of the substitution, insertion, and deletion costs between the various transformations in a GLD.

Thus, the Levenshtein distance or the GLD may be used to measure the distance between any pair of entries in the corpus 46. Similarly, the distance for the entire corpus 46 may be calculated by averaging the distance calculated between each pair selected from all of the text entries in the corpus 46. Thus, if the corpus 46 includes m entries, the $i^{th}$ entry is denoted by $e(i)$ and the $j^{th}$ entry is denoted by $e(j)$, the distance for the entire corpus 46 may be calculated as:

$$D = \frac{2 \cdot \sum_{i=1}^{m} \sum_{j>i}^{m} ld(e(i), e(j))}{m \cdot (m-1)}$$

The optimization function of the database selector 42 may recursively select the next entry in the database 48 as the text entry that maximizes the average distance between all of entries in the database and each of the text entries remaining in the corpus 46. For example, the optimization function may calculate the Levenshtein distance $ld(e(i), e(j))$ for a set of pairs that includes each text entry in the database 48 paired with each other text entry in the database 48. The set of pairs optionally may not include the combination wherein the first entry is the same as the second entry. The optimization function may select the text entries $e(i)$, $e(j)$ of the text entry pair $(e(i), e(j))$ having the maximum Levenshtein distance $ld(e(i), e(j))$ as subset_e(1) and subset_e(2), the initial text entries in the database 48. The database selector 42 saves the text entries subset_e(1) and subset_e(2) in the database 48. The optimization function may identify the text entry selection $e(i)$ that approximately maximizes the amount of new information brought into the database 48 using the following formula where k denotes the number of text entries in the database 48. Then p entry from corpus is selected and added into the database as k+1 entry.

$$p = \arg\max_{(1 \leq i \leq m)} \left\{ \sum_{j=1, e(i) \neq subset\_e(j)}^{k} ld(e(i), subset\_e(j)) \right\}$$

Thus, the optimization function selects the text entry $e(i)$ of the corpus having the maximum Levenshtein distance sum $$\sum_{j=1, e(i) \neq subset\_e(j)}^{k} ld(e(i), subset\_e(j))$$

as subset_e(k+1), the $(k+1)^{th}$ text entry in the database 48. The database selector 42 saves the text entry subset_e(k+1) in the database 48. The database selector 42 saves text entries to the database 48 until the number of entries k of the database 48 equals a size defined for the database 48.

Figure 2:
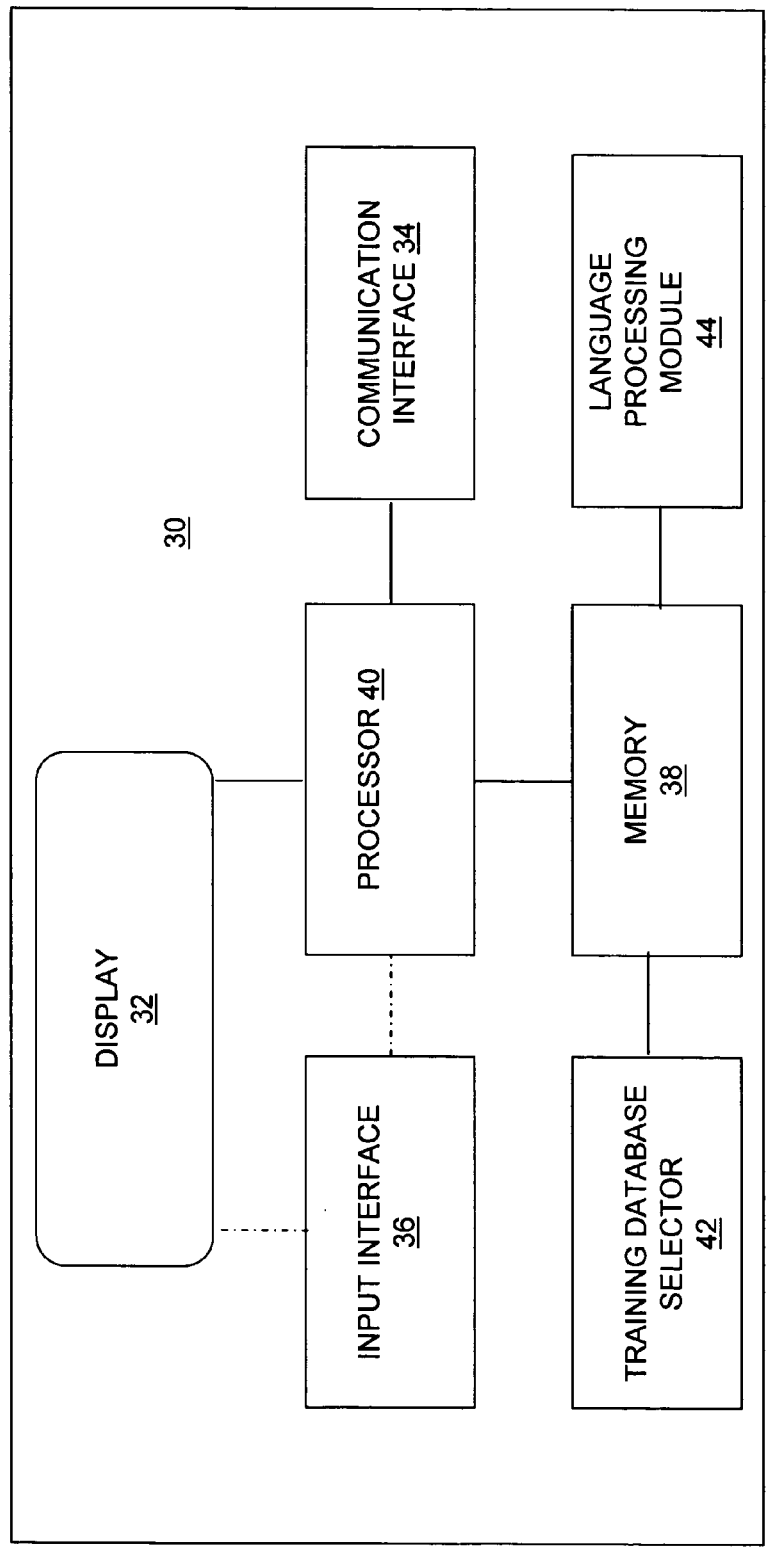
FIG. 2 is a block diagram of a device that may host the language processing module training sequence of FIG. 1 in accordance with an exemplary embodiment.

In an exemplary embodiment, the device 30, as shown in FIG. 2, may include, but is not limited to, a display 32, a communication interface 34, an input interface 36, a memory 38, a processor 40, the database selector 42, and the language processing module 44. The display 32 presents information to a user. The display 32 may be, but is not limited to, a thin film transistor (TFT) display, a light emitting diode (LED) display, a Liquid Crystal Display (LCD), a Cathode Ray Tube (CRT) display, etc.

The communication interface 34 provides an interface for receiving and transmitting calls, messages, and any other information communicable between devices. The communication interface 34 may use various transmission technologies including, but not limited to, CDMA, GSM, UMTS, TDMA, TCP/IP, GPRS, Bluetooth, IEEE 802.11, etc. to transfer content to and from the device.

The input interface 36 provides an interface for receiving information from the user for entry into the device 30. The input interface 36 may use various input technologies including, but not limited to, a keyboard, a pen and touch screen, a mouse, a track ball, a touch screen, a keypad, one or more buttons, speech, etc. to allow the user to enter information into the device 30 or to make selections. The input interface 36 may provide both an input and output interface. For example, a touch screen both allows user input and presents output to the user.

The memory 38 may be the electronic holding place for the operating system, the database selector 42, and the language processing module 44, and/or other applications and data including the corpus 46 and/or the database 48 so that the information can be reached quickly by the processor 40. The device 30 may have one or more memory 38 using different memory technologies including, but not limited to, Random Access Memory (RAM), Read Only Memory (ROM), flash memory, etc. The database selector 42, the language processing module 44, the corpus 46, and/or the database 48 may be stored by the same memory 38. Alternatively, the database selector 42, the language processing module 44, the corpus 46, and/or the database 48 may be stored by different memories 38. It should be understood that the database selector 42 may also be stored someplace outside of device 30.

The database selector 42 and the language processing module 44 are organized sets of instructions that, when executed, cause the device 30 to behave in a predetermined manner. The instructions may be written using one or more programming languages, assembly languages, scripting languages, etc. The database selector 42 and the language processing module 44 may be written in the same or different computer languages including, but not limited to high level languages, scripting languages, assembly languages, etc.

The processor 40 may retrieve a set of instructions such as the database selector 42 and the language processing module 44 from a non-volatile or a permanent memory and copy the instructions in an executable form to a temporary memory. The processor 40 executes an application or a utility, meaning that it performs the operations called for by that instruction set. The processor 40 may be implemented as a special purpose computer, logic circuits, hardware circuits, etc. Thus, the processor 40 may be implemented in hardware, firmware, software, or any combination of these methods. The device 30 may have one or more processor 40. The database selector 42, the language processing module 44, the operating system, and other applications may be executed by the same processor 40. Alternatively, the database selector 42, the language processing module 44, the operating system, and other applications may be executed by different processors 40.

Figure 3:
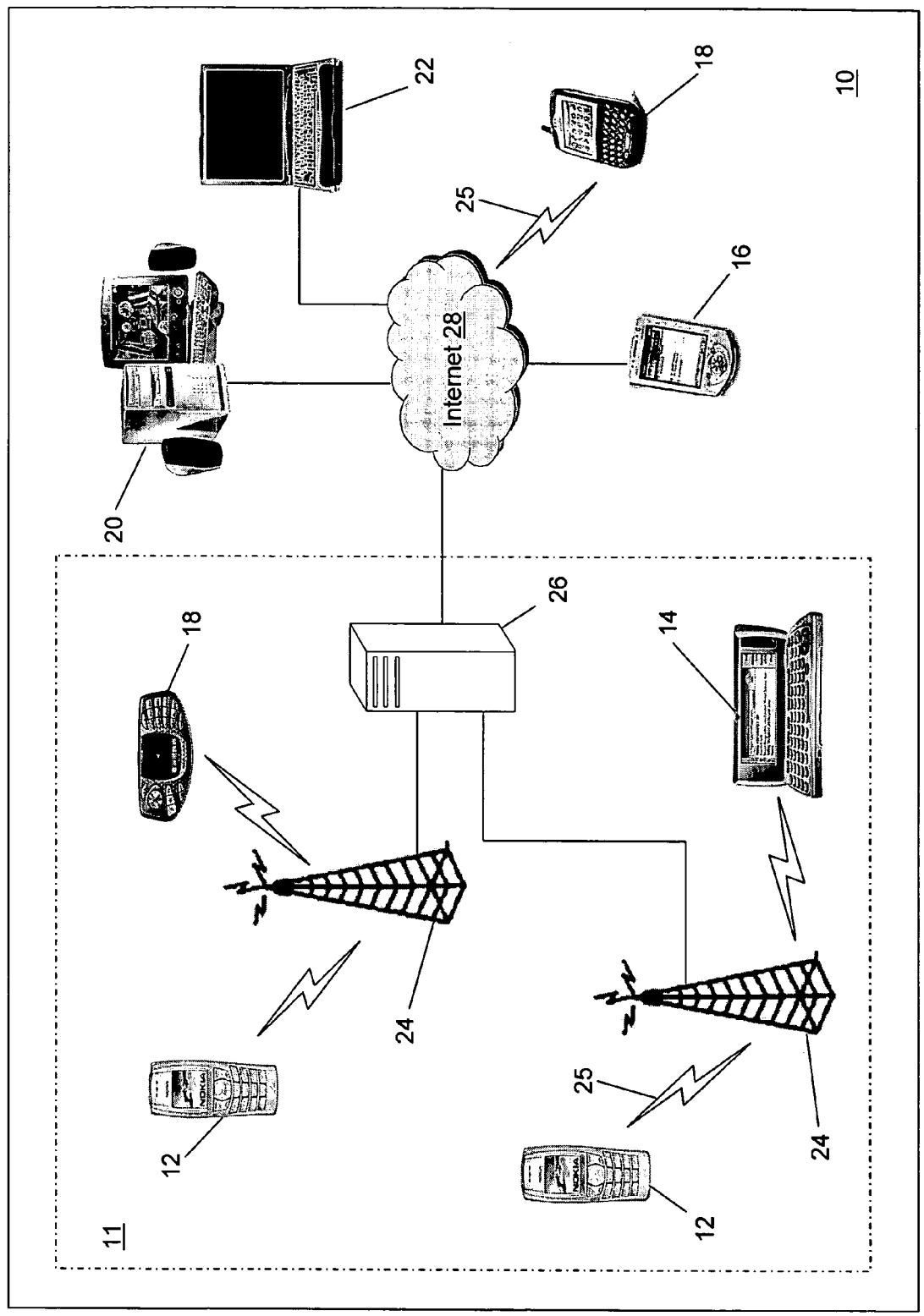
FIG. 3 is an overview diagram of a system that may include the device of FIG. 2 in accordance with an exemplary embodiment.

With reference to FIG. 3, the system 10 is comprised of multiple devices that may communicate with other devices using a network. The system 10 may comprise any combination of wired or wireless networks including, but not limited to, a cellular telephone network, a wireless Local Area Network (LAN), a Bluetooth personal area network, an Ethernet LAN, a token ring LAN, a wide area network, the Internet, etc. The system 10 may include both wired and wireless devices. For exemplification, the system 10 shown in FIG. 1 includes a cellular telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary devices of system 10 may include, but are not limited to, a cellular telephone 12, a combination Personal Data Assistant (PDA) and cellular telephone 14, a PDA 16, an integrated communication device 18, a desktop computer 20, and a notebook computer 22. Some or all of the devices may communicate with service providers through a wireless connection 25 to a base station 24. The base station 24 may be connected to a network server 26 that allows communication between the cellular telephone network 11 and the Internet 28. The system 10 may include additional devices and devices of different types.

The optimization function of the database selector 42 has been verified in a syllabification task. Syllables are basic units of words that comprise a unit of coherent grouping of discrete sounds. Each syllable is typically composed of more than one phoneme. The syllable structure grammar divides each syllable into onset, nucleus, and coda. Each syllable includes a nucleus that can be either a vowel or a diphtong. The onset is the first part of a syllable consisting of consonants that precede the nucleus of the syllable. The coda is the part of a syllable that follows the nucleus. For example, given the syllable [t eh k s t], /t/ is the onset, /eh/ is the nucleus, and /k s t/ is the coda. For training a data-driven syllabification model, phoneme sequences are mapped into their ONC representation. The model is trained on the mapping between pronunciations and their ONC representation. Given a phoneme sequence in the decoding phase after training of the model, the ONC sequence is generated, and the syllable boundaries are uniquely decided based on the ONC sequence.

The syllabification task used to verify the utility of the optimization function included the following steps:

1. Pronunciation phoneme strings were mapped into ONC strings, for example: (word) "text"->(pronunciation) "t eh k s t"->(ONC) "O N C C C"

2. The language processing module was trained on the data in the format of "pronunciation->ONC"

3. Given the pronunciation, the corresponding ONC sequence was generated from the language processing module. The syllable boundaries were placed at the location starting with a symbol "O" or "N" if the syllable is not preceded with a symbol "O".

The neural network-based ONC model used was a standard two-layer multi-layer perceptron (MLP). Phonemes were presented to the MLP network one at a time in a sequential manner. The network determined an estimate of the ONC posterior probabilities for each presented phoneme. In order to take the phoneme context into account, neighboring (e.g. context size of 4) phonemes from each side of the target phoneme were used as input to the network. A context size of four phonemes was used. Thus, a window of p-4 . . . p4 phonemes centered at phoneme p0 was presented to the neural network as input. The centermost phoneme p0 was the phoneme that corresponded to the output of the network. Therefore, the output of the MLP was the estimated ONC probability for the centermost phoneme p0 in the given context p-4 . . . p4. The ONC neural network was a fully connected MLP that used a hyperbolic tangent sigmoid shaped function in the hidden layer and a softmax normalization function in the output layer. The softmax normalization ensured that the network outputs were in the range [0,1] and summed to unity.

The neural network based syllabification task was evaluated using the Carnegie-Mellon University (CMU) dictionary for US English as the corpus 46. The dictionary contained 10,801 words with pronunciations and labels including the ONC information. The pronunciations and the mapped ONC sequences were selected from the corpus 46 that comprised the CMU dictionary to form the database 48. The database 48 was selected from the entire corpus using a decimation function and the optimization function. The test set included the data in the corpus not included in the database 48.

Figure 4:
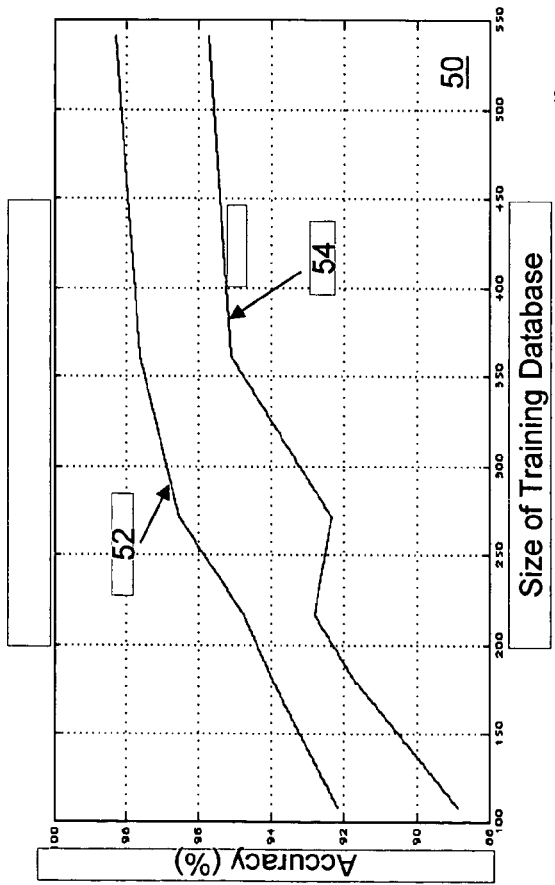
FIG. 4 is a first diagram comparing the accuracy of the language processing module wherein the language processing module has been trained using two different database selectors to select the database.

FIG. 4 shows a comparison 50 of the experimental results achieved using the two data different database selection functions, decimation and optimization. The comparison 50 includes a first curve 54 and a second curve 52. The first curve 54 depicts the results achieved using the decimation function for selecting the database. The second curve 52 depicts the results achieve using the optimization function for selection the database. The first curve 54 and the second curve 52 represent the accuracy of the language processing module trained using the database selected using each selection function. The accuracy is the percent of correct ONC sequence identifications and syllable boundary identifications achieved given a pronunciation from the CMU dictionary test set.

In general, the greater the size of the database, the better the performance of the language processing module. The results show that the optimization function outperformed the decimation function. The average improvement achieved using the optimization function was 38.8% calculated as Improvement rate=((decimation error rate−optimization error rate)/decimation error rate)×100%. Thus, for example, given a database size of 300 words, the decimation function achieved an accuracy of ~93% in determining the ONC sequence given the pronunciation as an input. Using the same database size of 300 words, the optimization function achieved an accuracy of ~97%. Thus, the selection of the database affected the generalization capability of the language processing module. Because the database was quasi-optimally selected, the accuracy was improved without increasing the size of the database.

Figure 5:
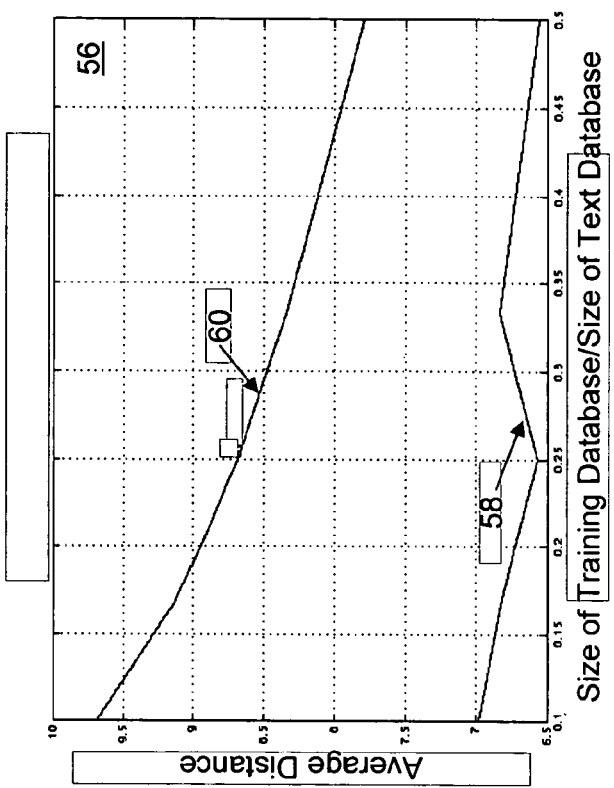
FIG. 5 is a second diagram comparing the average distance among entries in the database selected by the two different database selectors.

FIG. 5 shows a comparison 56 of the average distance of the database achieved using the two data different database selection functions. The comparison 56 includes a third curve 58 and a fourth curve 60. The third curve 58 depicts the results achieved using the decimation function for selecting the database. The fourth curve 60 depicts the results achieve using the optimization function for selection the database. The third curve 58 and the fourth curve 60 represent the average distance of the database selected using each function. An increase in average distance indicates an increase in the expected coverage of the corpus by the database selected. The average distance within the database selected using the decimation function was approximately evenly distributed varying by less than 0.5 as the database size relative to the enter corpus increased. In comparison, the average distance within the database selected using the optimization function decreased monotonically with increasing database size. Thus, the difference in the average distance calculated increased as the database size was reduced. As expected, the difference in the average distance calculated converged to zero as the database size increased to include more of the entire corpus. Thus, the verification results indicate that the described optimization function extracts data more efficiently from the corpus so that the selected database provides better coverage of the corpus and ultimately improves the accuracy of the language processing module.

It is understood that the invention is not confined to the particular embodiments set forth herein as illustrative, but embraces all such modifications, combinations, and permutations as come within the scope of the following claims. Thus, the description of the preferred embodiments is for purposes of illustration and not limitation.

What is claimed is:

1. A method of selecting a training database from a corpus, the method comprising:
    pre-defining a size of the training database, the size of the training database being indicative of an optimally minimal subset of the corpus;
    calculating a coefficient for at least one pair in a set of pairs of entries, the coefficient comprising distance between the at least one pair of entries; and
    executing a function to recursively select each entry to be saved in the training database based upon the calculated coefficient until a number of entries of the training database equals the size of the training database, the executing of the function comprising:
        (a) selecting an initial pair of entries from the set of pairs, wherein the initial pair has a distance that is greater than the distance calculated for each other pair in the set of pairs;
        (b) moving the initial pair into the training database;
        (c) identifying a new entry from the corpus, for which the average coefficient to entries in the training database is greater than average distances calculated for all other entries in the corpus;
        (d) moving the new entry from the corpus into the training database; and
        (e) if a number of entries of the training database is less than the pre-defined size of the training database, repeating (c) and (d).

2. The method of claim 1, wherein the function comprises an optimization function utilizing the coefficient.

3. The method of claim 1, wherein the pair comprises two entries selected from a corpus.

4. The method of claim 1, wherein the pair comprises one entry selected from a set of previously selected entries and another entry selected from a set from a remaining portion of the corpus.

5. The method of claim 1, wherein the function is selected from the group consisting of a Levenshtein distance function, and a generalized Levenshtein distance function.

6. The method of claim 1, wherein the set of pairs does not include the combination wherein the two entries are equal.

7. The method of claim 1, wherein the corpus contains data wherein the data is selected from the group consisting of a word, a phoneme, a grapheme, a syllable, and an onset-nucleus-coda representation.

8. A computer program product, embodied in a computer-readable medium, for selecting a training database from a corpus, the computer code configured to:
    pre-define a size of the training database, the size of the training database being indicative of an optimally minimal subset of the corpus;
    calculate a coefficient for at least one pair in a set of pairs of entries, the coefficient comprising distance between the at least one pair of entries; and
    execute a function to recursively select each entry to be saved in the training database based upon the calculated coefficients until a number of entries of the training database equals the size of the training database, wherein the computer code configured to execute the function further comprises computer code configured to:
        (a) select an initial pair of entries from the set of pairs, wherein the initial pair has a distance that is greater than the distance calculated for each other pair in the set of pairs;
        (b) move the initial pair into the training database;
        (c) identify a new entry from the corpus, for which the average coefficient to entries in the training database is greater than average distances calculated for all other entries in the corpus;
        (d) move the new entry from the corpus into the training database; and (e) if a number of entries of the training database is less than the pre-defined size of the training database, repeat (c) and (d).

9. The computer program product of claim 8, wherein the function comprises an optimization function utilizing the coefficient.

10. The computer program product of claim 8, wherein the pair comprises two entries selected from a corpus.

11. The computer program product of claim 8, wherein the pair comprises one entry selected from a set of previously selected entries and another entry selected from a set from a remaining portion of the corpus.

12. The computer program product of claim 8, wherein the function is selected from the group consisting of a Levenshtein distance function, and a generalized Levenshtein distance function.

13. A device configured for selecting a training database from a corpus, the device comprising a processor and computer code stored into memory, the computer code configured to:
   pre-define a size of the training database, the size of the training database being indicative of an optimally minimal subset of the corpus;
   calculate a coefficient for at least one pair in a set of pairs of entries, the coefficient comprising distance between the at least one pair of entries; and
   execute a function to recursively select each entry to be saved in the training database based upon the calculated coefficients until a number of entries of the training database equals the size of the training database, wherein the computer code configured to execute the function further comprises computer code configured to:
   (a) select an initial pair of entries from the set of pairs, wherein the initial pair has a distance that is greater than the distance calculated for each other pair in the set of pairs;
   (b) move the initial pair into the training database;
   (c) identify a new entry from the corpus, for which the average coefficient to entries in the training database is greater than average distances calculated for all other entries in the corpus;
   (d) move the new entry from the corpus into the training database; and
   (e) if a number of entries of the training database is less than the pre-defined size of the training database, repeat (c) and (d).

14. The device of claim 13, wherein the function comprises an optimization function utilizing the coefficient.

15. The device of claim 13, wherein the pair comprises two entries selected from a corpus.

16. The device of claim 13, wherein the pair comprises one entry selected from a set of previously selected entries and another entry selected from a set from a remaining portion of the corpus.

17. A system for processing linguistic inputs to determine an output, the system comprising:
   a memory unit including computer code configured to:
      pre-define a size of a training database, the size of the training database being indicative of an optimally minimal subset of the corpus;
      calculate a coefficient for at least one pair in a set of pairs of entries, the coefficient comprising distance between the at least one pair of entries; and
      execute a function to recursively select each entry to be saved in the training database until a number of entries of the training database equals the size of the training database, wherein the computer code configured to execute the function further comprises computer code configured to:
      (a) select an initial pair of entries from the set of pairs, wherein the initial pair has a distance that is greater than the distance calculated for each other pair in the set of pairs;
      (b) move the initial pair into the training database;
      (c) identify a new entry from the corpus, for which the average coefficient to entries in the training database is greater than average distances calculated for all other entries in the corpus;
      (d) move the new entry from the corpus into the training database; and
      (e) if a number of entries of the training database is less than the pre-defined size of the training database, repeat (c) and (d).

18. The system of claim 17, wherein the function comprises an optimization function utilizing the coefficient.

19. The system of claim 17, wherein the pair comprises two entries selected from a corpus.

20. The system of claim 17, wherein the pair comprises one entry selected from a set of previously selected entries and another entry selected from a set from a remaining portion of the corpus.

21. A module configured for selecting a training database from a corpus, comprising:
   a memory unit including computer code configured to:
      pre-define a size of the training database, the size of the training database being indicative of an optimally minimal subset of the corpus;
      calculate a coefficient for at least one pair in a set of pairs of entries, the coefficient comprising distance between the at least one pair of entries; and
      execute a function to select each entry to be saved in the training database based upon the calculated coefficients until a number of entries of the training database equals the size of the training database, wherein the computer code configured to execute the function further comprises computer code configured to:
      (a) select an initial pair of entries from the set of pairs, wherein the initial pair has a distance that is greater than the distance calculated for each other pair in the set of pairs;
      (b) move the initial pair into the training database;
      (c) identify a new entry from the corpus, for which the average coefficient to entries in the training database is greater than average distances calculated for all other entries in the corpus;
      (d) move the new entry from the corpus into the training database; and
      (e) if a number of entries of the training database is less than the pre-defined size of the training database, repeat (c) and (d).

22. The module of claim 21, wherein the function comprises an optimization function utilizing the coefficient.

23. The module of claim 21, wherein the pair comprises two entries selected from a corpus.

24. The module of claim 21, wherein the pair comprises one entry selected from a set of previously selected entries and another entry selected from a set from a remaining portion of the corpus.

* * * * *